Aug. 6, 1946.   G. A. SMITH   2,405,460
DOOR SEAL
Filed Oct. 2, 1944

INVENTOR
Glen A. Smith
BY
Blackmore, Spencer & Flint
ATTORNEYS

Patented Aug. 6, 1946

2,405,460

UNITED STATES PATENT OFFICE 2,405,460

DOOR SEAL

Glen A. Smith, Detroit, Mich., assignor to General Motors Corporation, Detroit, Mich., a corporation of Delaware Application October 2, 1944, Serial No. 556,680

4 Claims. (Cl. 20—69)

This invention relates to automobiles and has particular reference to a seal between the edge of the automobile door and the body.

In modern automobile practice it is desirable to have a tight seal between the edge of the door and the body so that rain water will be excluded. In the past a seal having a single sealing surface has been used and it has also been known that rain will, at times, pass this seal and enter the car.

The object of the invention is to form a seal which will make a weather-tight closure at all times and to this end the seal comprises a strip of flexible material, preferably rubber, which has an inner and an outer part which abuts against jamb faces on the adjacent door pillar to form a double seal. Between these two double seals the strip of rubber has a groove to enable any rain passing the first seal to flow to the bottom of the door and then to the outside of the vehicle.

Figure 1:
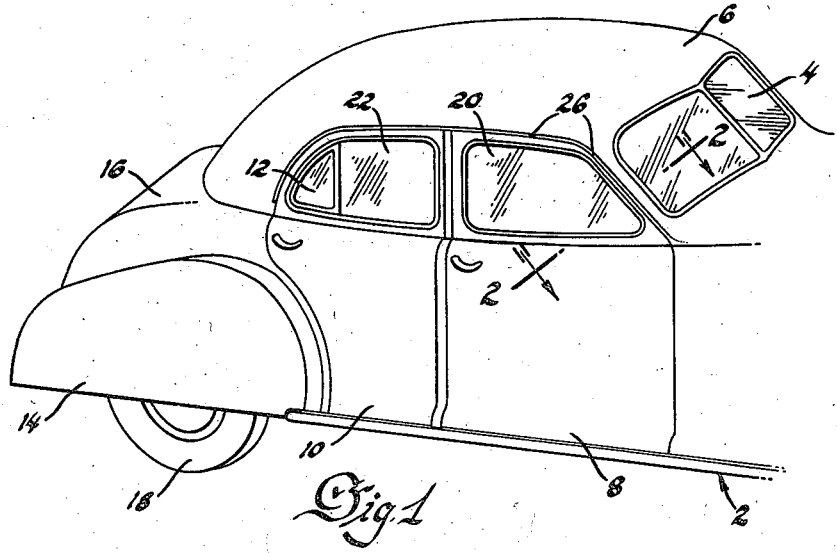
Figure 1 shows a side view of a portion of an automobile showing the invention applied.

On the drawing the numeral 2 indicates an automobile as a whole. The automobile has the windshield 4, the roof 6, the front door 8, the rear door 10 having a ventilating window 12, the rear fender 14, the rear deck 16 and the wheels 18. The doors 8 and 10 have the usual raisable and lowerable windows 20 and 22.

Figure 2:
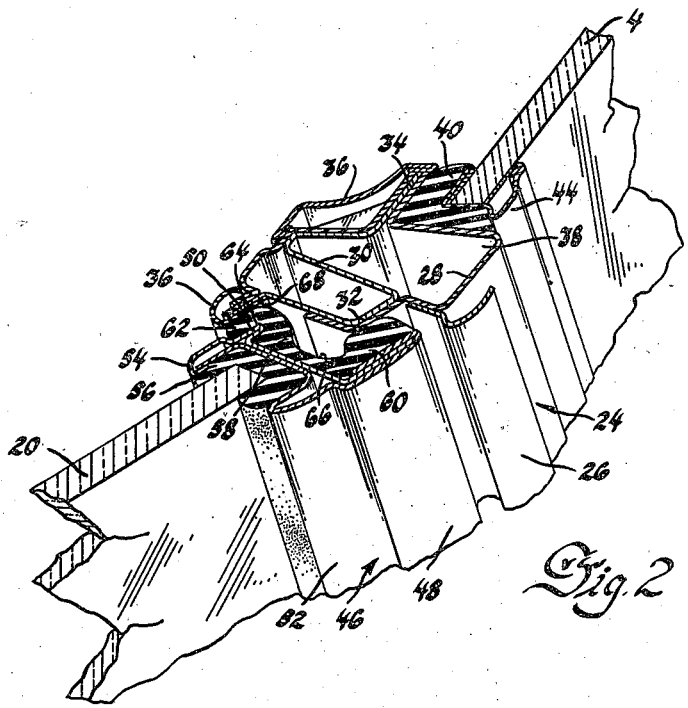
Figure 2 is a sectional view on the line 2—2 of Figure 1, the view being shown somewhat in perspective better to show the invention.

In the cross-sectional view in Figure 2 the front door pillar and windshield post is indicated at 24. The pillar is provided with the usual exterior rain channel 26 which receives the rain from the roof and leads it away from the door. The pillar 24 is of hollow construction and is composed of two parts 28 and 30 which are of the shape shown and are united at their adjoining surfaces at 32 and 34. Suitable finish strips 36 are used.

Part 28 is provided with a shoulder 38 which receives the rubber seal 40 on which there is positioned the frame 44 of the windshield glass 4.

The door 8 has the door pillar indicated as a whole at 46. The pillar has the exterior jamb flange 48 and the interior shorter jamb flange 50. The post is hollow and is of the shape shown and has formed therein the window guide 52 and 54 in which there is received the usual fabric or rubber window channel 56 to guide the window 20.

The flexible sealing strip of the invention is indicated as a whole at 58. The strip comprises the outer sealing part 60 and the inner sealing part 62. The inner seal part 62 is provided with a recess 64 in which there is received the shorter inner jamb flange 50 of the door. The seal completely fills in the space between the flanges 48 and 50 and extends interiorly of the door beyond the flange 64. Between the sealing parts 60 and 62 the seal is provided with a channel 66 which extends the length of the strip and preferably the strip 58 extends entirely around the sides and top of the door.

The door pillar 24 is provided with jamb surfaces at 32 and 68, which cooperate with the jamb faces of the flanges 48 and 64, and against these jamb surfaces the parts 60 and 62 of the seal 66 are adapted to abut or strike when the door is in closed position. When the door is closed the parts 60 and 62 are under compression to form a tight seal.

The rubber strip 58 may be secured to the door edge in any suitable way such as by glueing, riveting or the like.

As a result of the invention the door seal has the double sealing surfaces at 32 and 68 and should any water pass the first surface at 32 the water will collect in the groove 66 and flow to the bottom of the door.

I claim:

1. In combination, a door post having abutment surfaces defining spaced substantially parallel planes, a door having first and second flanges projecting therefrom, a compressible sealing member secured to said door between its flanges, and embracing one of said flanges, said sealing member having spaced projections to engage said post abutment surfaces when the door is closed.

2. The invention defined by claim 1, said door flanges being parallel with each other and with the post abutment surfaces when the door is closed.

3. The invention defined by claim 1, the door flange which is embraced by the sealing member projecting less than the other.

4. The invention defined by claim 1, the space between the projections of the seal serving as a rain channel.

GLEN A. SMITH.